Figure 1:
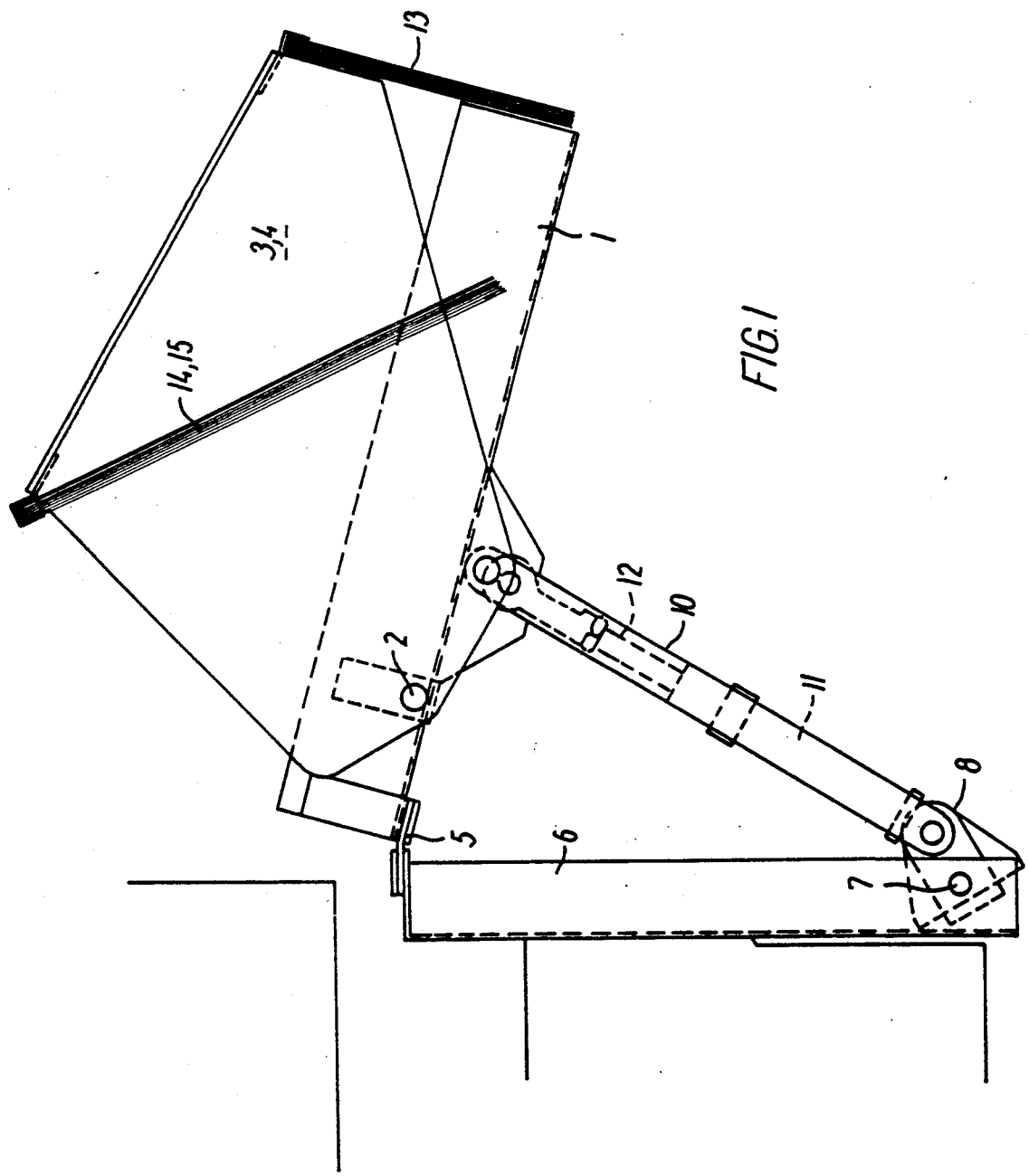

United States Patent [19]

Petersen

[11] Patent Number: 5,191,947
[45] Date of Patent: Mar. 9, 1993

[54] WEIGHING PAN FOR WEIGHING BATCHES OF PRODUCTS AND A COMBINATION WEIGHING MACHINE EQUIPPED WITH A NUMBER OF SUCH WEIGHING PANS

[76] Inventor: Gunnar C. Petersen, 14 Rodkildevaenget, DK-5230 Odense M, Denmark

[21] Appl. No.: 622,799

[22] Filed: Dec. 5, 1990

[30] Foreign Application Priority Data

Dec. 13, 1989 [DK] Denmark .............................. 6284/89

[51] Int. Cl.⁵ .......................................... G01G 13/00
[52] U.S. Cl. ................... 177/25.18; 177/59; 177/108; 177/162; 177/261; 177/262
[58] Field of Search ...................... 177/25.18, 59, 162, 177/261, 262, 108

[56] References Cited

U.S. PATENT DOCUMENTS

| | | | |
|---|---|---|---|
| 2,586,557 | 2/1952 | Newbold | 177/59 |
| 2,670,921 | 3/1954 | Dodd | 177/59 |
| 3,155,183 | 11/1964 | Bradford | 177/162 |
| 3,400,775 | 9/1968 | Mackenzie et al. | 177/108 |
| 3,695,371 | 10/1972 | Sheetz | 177/59 |
| 3,696,584 | 10/1972 | Rickard | 53/239 |
| 4,177,621 | 12/1979 | Powell, Jr. | 53/468 |
| 4,545,446 | 10/1985 | Kokabu | 177/108 |
| 4,660,664 | 4/1987 | Petersen | 177/108 |
| 4,995,467 | 2/1991 | Niewmann | 177/25.18 |

FOREIGN PATENT DOCUMENTS 0178828 4/1986 European Pat. Off. .
1467062 3/1977 United Kingdom .

Primary Examiner—Benjamin R. Fuller
Assistant Examiner—Randy W. Gibson
Attorney, Agent, or Firm—Stevens, Davis, Miller & Mosher

[57] ABSTRACT

A weighing pan 17 for weighing subportions of products to be packaged batchwise, in particular for use in combination weighing of irregularly shaped and comparatively fragile commodities of fruits and vegetables. The pan has a discharge opening covered by a front wall and which is opened by a pivot movement of a bottom flap (1) between a products collecting position and a discharging position. The weighing pan is designed to collect individual product units substantially arranged in a single row on the bottom flap (1) and the bottom flap (1) extending throughout the length of the weighing pan slopes downwardly in the discharging position towards the discharge opening at such an angle that the collected product units are discharged by a substantially sliding movement. The invention includes a combination weighing machine comprising a number of weighing pans (17) with a stop member (23) common to the weighing pans (17) extending along the discharge openings of the weighing pans (17), said stop member being associated with the receiver conveyor and being movable transversely thereto from a position in which it covers the discharge openings of the weighing pans (17), to a second position at the other side of the receiver conveyor (19, 20), and from there back to the initial position along a path above the subportions discharged on the receiver conveyor.

10 Claims, 8 Drawing Sheets

WEIGHING PAN FOR WEIGHING BATCHES OF PRODUCTS AND A COMBINATION WEIGHING MACHINE EQUIPPED WITH A NUMBER OF SUCH WEIGHING PANS

The invention relates to a weighing pan for weighing products to be packaged batchwise, in particular for use in combination weighing of irregularly shaped and comparatively fragile fruit and vegetable products, said weighing pan having a discharge opening covered by a front wall and which is opened by a pivotal movement of a bottom flap between a products collecting position and a discharging position.

Computer-controlled combination weighing is well known in connection with metering ready-for-sale batches of many different commodities, including articles of irregularly shaped units having individual weight variations, e.g. a number of fruit and vegetable products.

In view of the fact that the basic principles of combination weighing are well known and have been described in a large number of patents, reference in this context is only made to EP patent No. 0 178 828 relating to a combination weighing machine with weighing pans of the above mentioned type.

Experience with the prior art combination weighing machines, e.g. as described in said EP patent, has shown that they are less suited for comparatively fragile products, such as apples, pears, tomatoes, peaches and the like, because inevitable collisions between the individual product units and between them and the weighing pans of the weighing machine and conveyor devices may result in a deterioration of quality that cannot be accepted in the market. For that reason combination weighing machines have had difficulties in finding use for a number of such products, in spite of their considerable advantages of capacity.

The object of the invention is to provide a weighing pan of a design capable of reducing to a considerable extend said risk of collision and thereby the risk of deterioration of the product.

According to the invention a weighing pan of the type referred to is characterized in that the weighing pan is designed to collect individual product units substantially arranged in a single row on the bottom flap and that in the discharging position the bottom flap extending throughout the length of the weighing pan slopes downwardly towards the discharge opening at such an angle that the collected product units are discharged with a substantially sliding movement.

This design provides for arranging in the collecting condition the individual product units collected in the weighing pan in a single row on the movable bottom flap and due to the mentioned downwards inclination which may typically vary from product to product, the product units will slide or glide down the bottom flap in a quiet flow without drifting apart, thereby being in an ordinary manner supplied to a delivery conveyor conveying the number of subportions constituting a determined batch to a packaging machine.

With the view of adaptation to different types of articles, a preferred embodiment may include means for adjusting the angle of inclination of the bottom flap in the discharging position. Thus, the same weighing pan and the same combination weighing machine may be used for instance for apples whose more spherical shape enhancing the rolling tendency requires a substantial small angle of inclination of the bottom flap, as well as for pears for whose more irregular shape the stated sliding movement is ensured by a larger angle of inclination.

In order to further reduce the risk of collision when filling product units into the weighing pan an embodiment of the weighing pan is characterized in that the front wall is resiliently yielding and that at a distance therefrom a likewise resiliently yielding brake member is arranged for reducing the velocity of the product units filled into the weighing pan.

By this design it is obtained that product units supplied to the weighing pan are braked by the brake member, thereby being quietly made to abut on the front wall or on a product unit already supplied.

The invention also relates to a combination weighing machine equipped with a number of weighing pans of the above mentioned type and with a delivery conveyor arrangement in connection with the discharge openings of the weighing pan.

With the view of further contributing to the reduction of the risk of collision also after the discharge of subportions from the weighing pans, such a combination weighing machine is according to the invention characterized in that a stop member common to the weighing pans is associated with a first receiving conveyor path extending along the discharge openings of all of the weighing pans in the delivery conveyor arrangement, said stop member being movable transversely to the receiving conveyor path from a first position in which it covers the discharge openings of all the weighing pans, to a second position at the other side of the receiving conveyor path, and from there back to the first position along a path above the subportions discharged on the receiving conveyor path.

When activated to effect said movement transversely to the receiving conveyor path immediately after opening of the weighing pans which in the actual case are emptying their subportions, it is ensured that all of said subportions are delivered on the conveyor, each in a quiet flow without getting clear of each other, which would expose them to collision.

Figure 2:
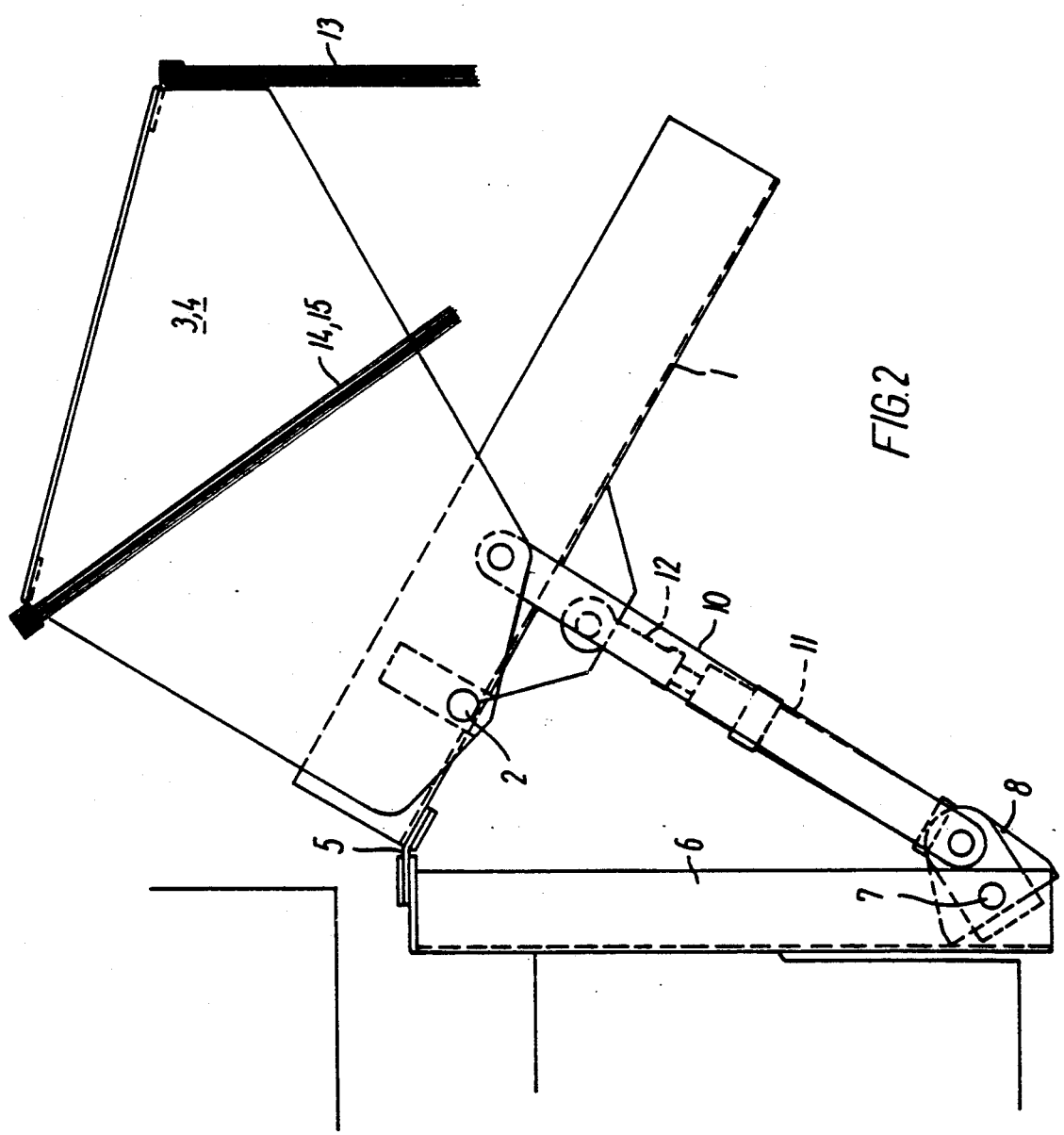

The invention will now be explained in more detail with reference to the schematical drawings, in which FIGS. 1 and 2 are side elevations of an embodiment of a weighing pan according to the invention in the collecting position and the discharging position, respectively.

Figure 3:
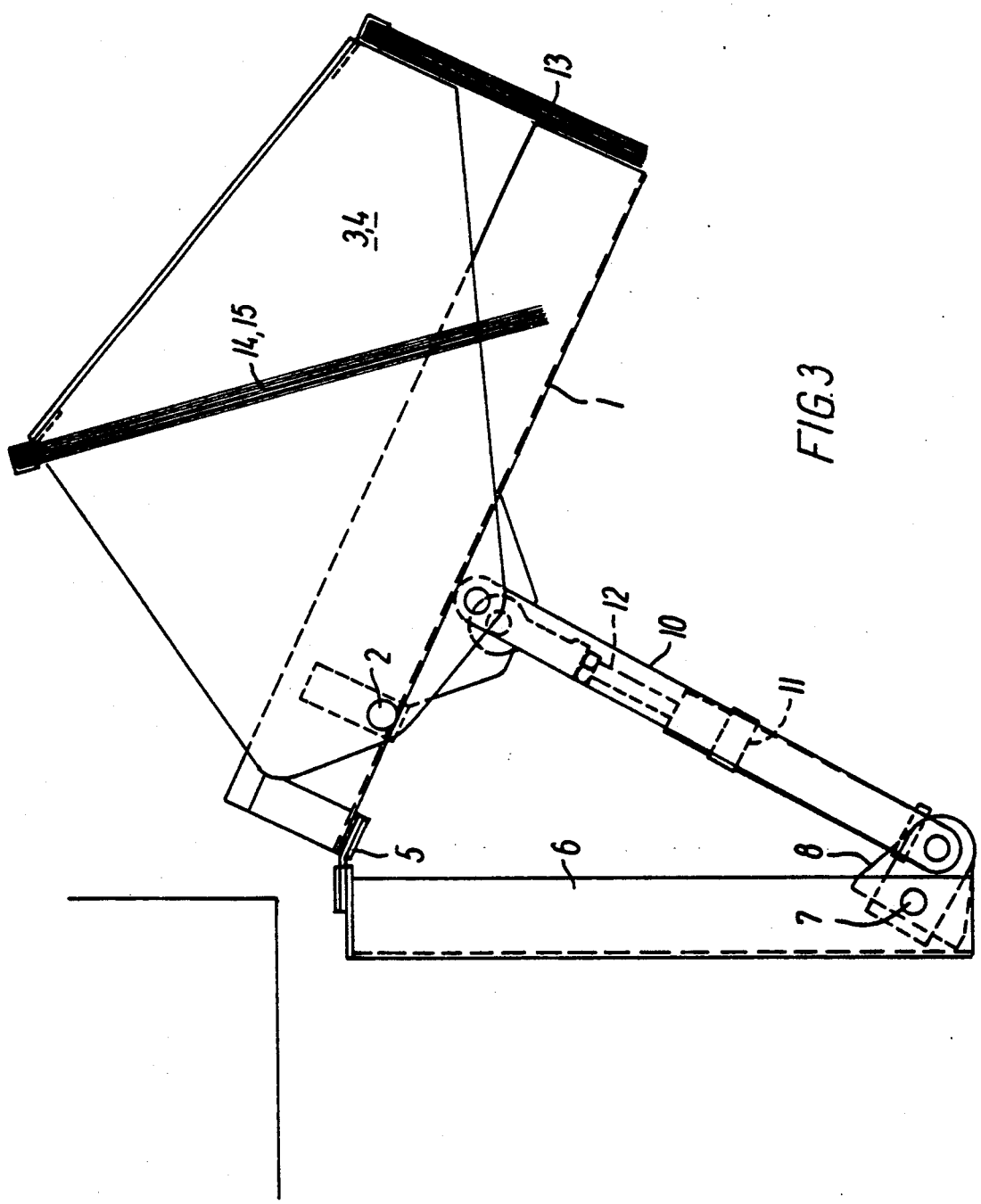
Figure 4:
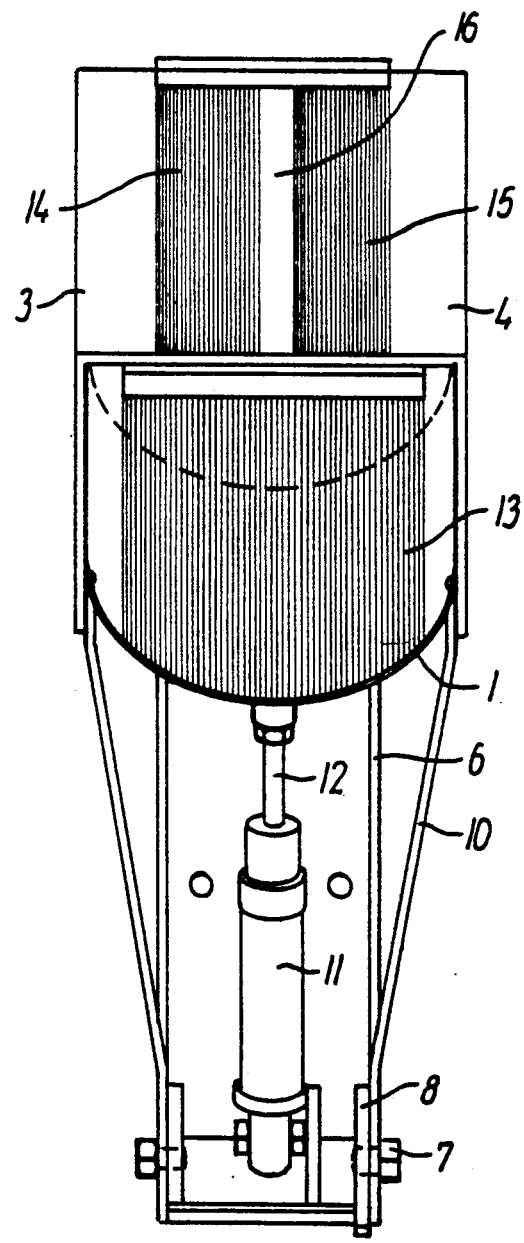
Figure 5:
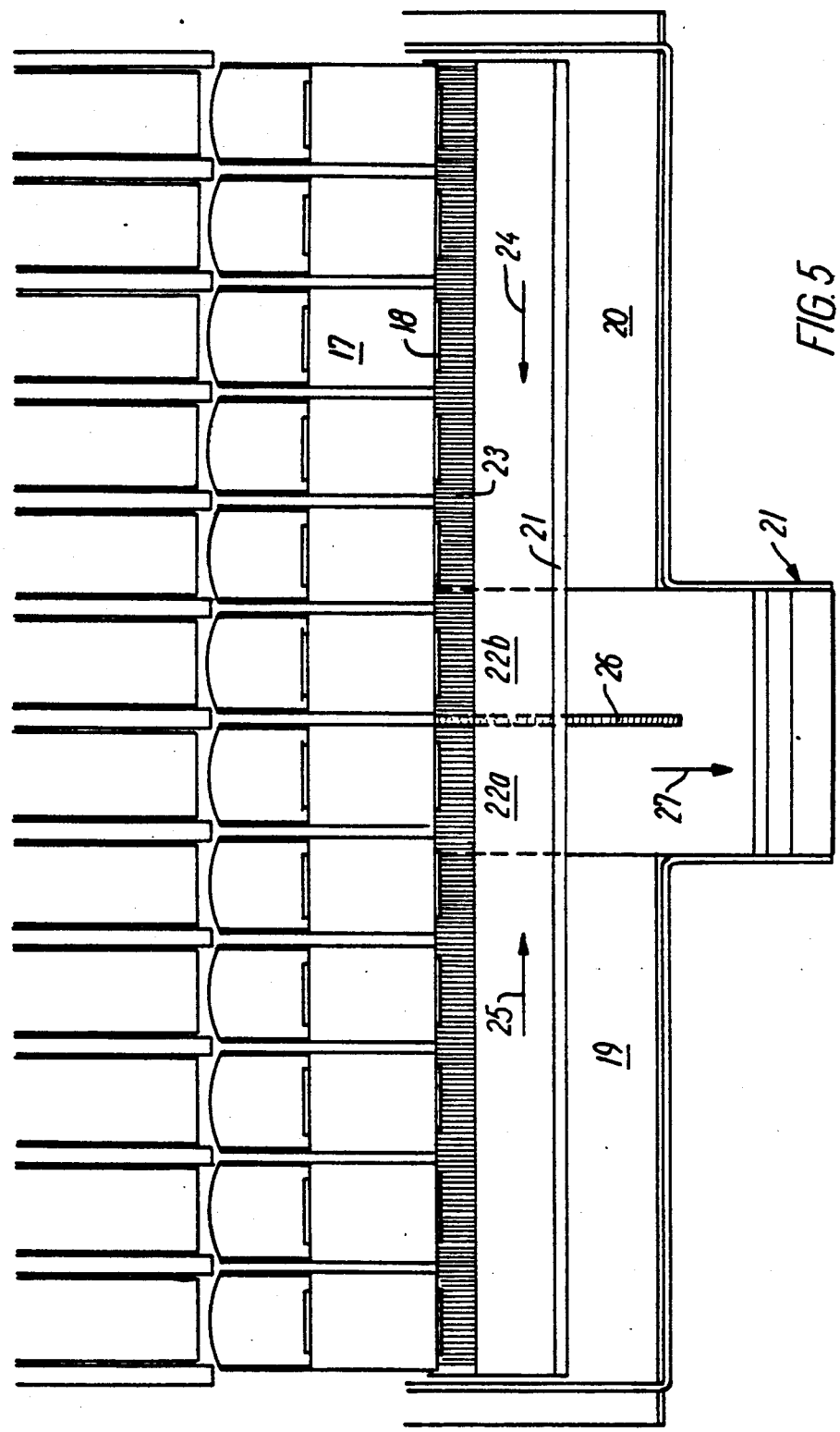
Figure 6:
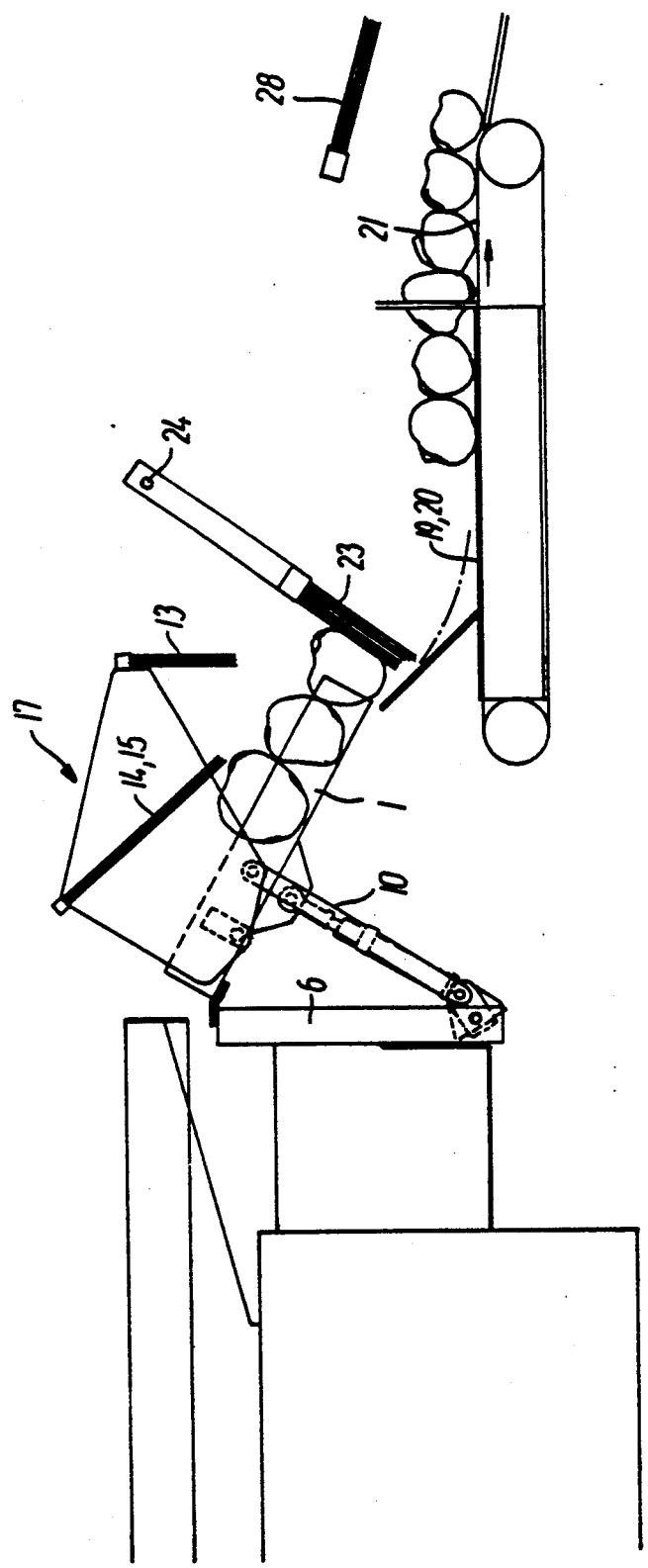
Figure 7:
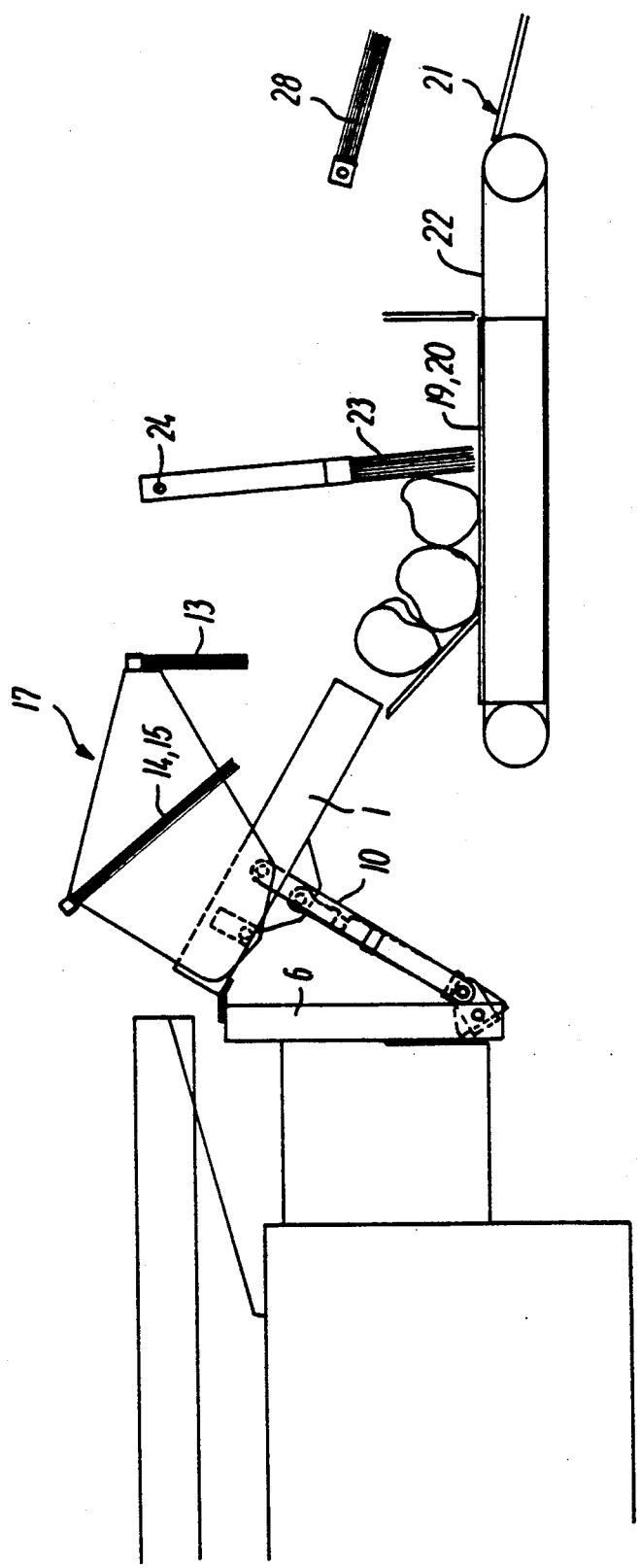
Figure 8:
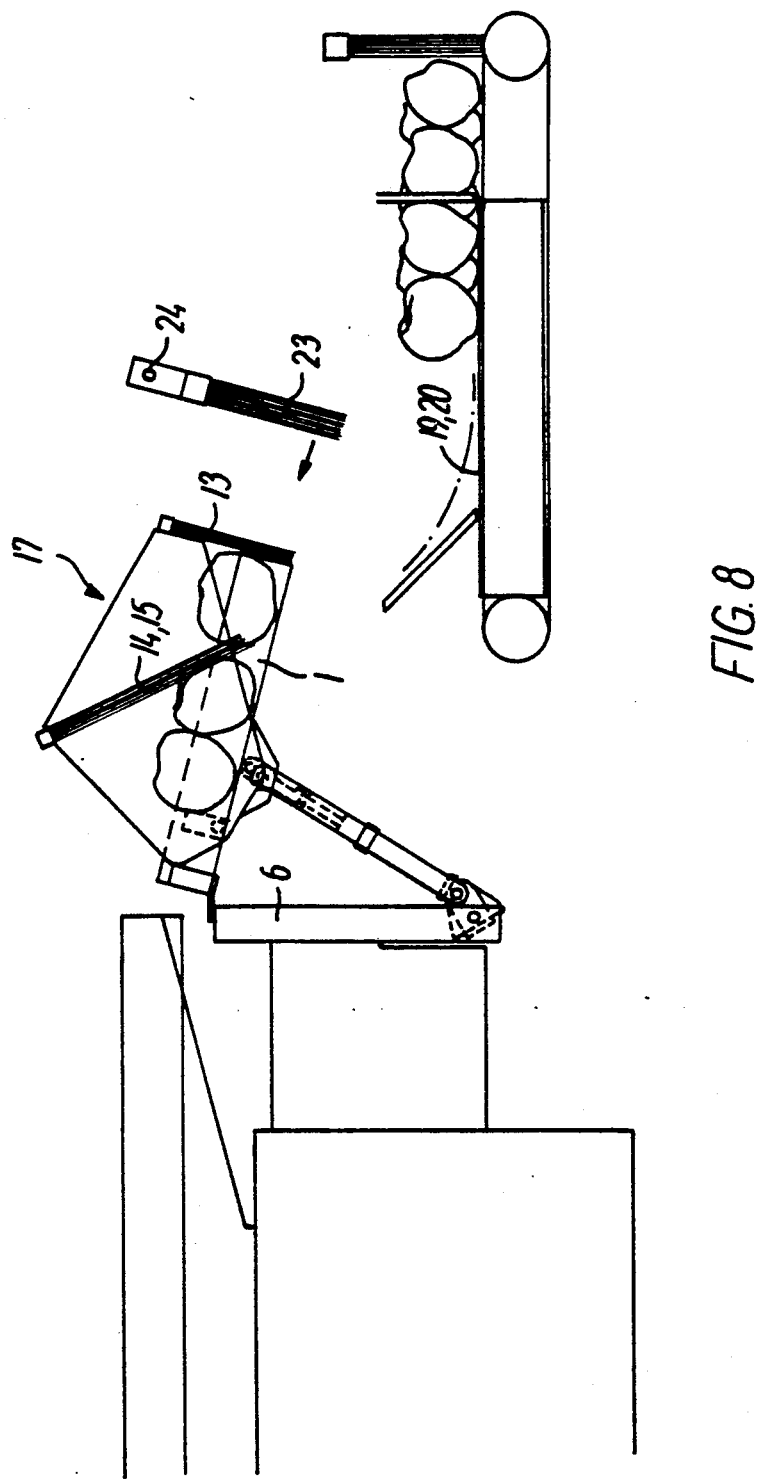

FIG. 3 is a view corresponding to FIG. 1 and showing the weighing pan with an altered setting of the angle of inclination of the bottom flap, FIG. 4 illustrates the weighing pan in FIGS. 1 and 2, viewed from the front and towards the discharge opening, FIG. 5 is a plane view of a number of weighing pans disposed side by side in connection with a delivery conveyor arrangement in a combination weighing machine, and FIGS. 6 to 8 are side elevations of a single weighing pan as illustrated in FIGS. 1 to 4 in connection with a receiving conveyor path in a combination weighing machine as illustrated in FIG. 5.

The embodiment illustrated in FIGS. 1 to 4 of a weighing pan according to the invention includes a bottom flap 1 extending throughout the length of the weighing pan and having in cross-section the shape of a downwardly arched chute, the purpose of which is to ensure that the collected product units, e.g. apples, are arranged in a single row and which in order to reduce the risk of product deterioration due to impact in a manner known per se may have a shock absorbing surface coating.

Bottom flap 1 is by a pivot pin 2 connected with the vertical, stationary sidewalls 3 and 4 of the weighing pan and is further by a hinge 5 pivotally connected with the top end of a stationary supporting frame 6. Triangular splice members 8 are pivotally secured about a pivot pin 7 at the lower end of the supporting frame 6 so that they can be switched between the positions shown in FIGS. 1 and 2, on the one hand and FIG. 4 on the other hand.

Each of the vertical sidewalls 3 and 4 is connected with an associated splice member 8 through a connecting rod 10 so that the sidewalls are stationary in a given position of splice members 8.

The lower end of a hydraulic or pneumatic working cylinder 11 is further connected with each splice member 8 and the working piston of said working cylinder is connected with a piston rod 12 which is connected with the bottom flap 1 of the weighing pan.

By means of the cylinder 11 and its associated piston the bottom flap of the weighing pan may be swung downwards from the collecting position shown in FIG. 1 to the discharging position shown in FIG. 2, in which the bottom flap slopes downwardly towards the discharge opening at such an angle of inclination that the product units collected in one row and positioned in contact with each other are discharged in a steady flow in a substantially sliding movement.

In the collecting position the discharge opening of the weighing pan is covered by a front wall in the form of a resiliently yielding brush 13 that is sufficiently stiff to retain the supplied product units in the weighing pan. Brush 13 is at the top secured to the front edge of sidewalls 3 and 4.

With the view of braking and reducing the velocity of the arriving product units the weighing pan further includes a brake member comprising in the illustrated embodiment two brushes 14 and 15 hanging down side by side with a mutual separation 16. Brushes 14 and 15 are secured at the top and at the back of the weighing pan, thereby sloping downwards and almost reaching the bottom flap 1 in the collecting position. The distance between brush 13 at the front wall and the lower end of brushes 14 and 15 is preferably chosen so as to make space in front of brushes 14 and 15 for a single product unit, e.g. an apple, and the braking provided by brush sets 14 and 15 thus prevents the following arriving product unit from impinging on the first one.

The weighing pan may quite well be provided with more brake members located behind each other like brushes 14 and 15 but it is, however, not necessary because the subportions collected in the weighing pans for commodities of fruits and vegetables generally merely include a few, e.g. 1 to 3, units so that the latest arriving units have a comparatively low velocity.

In the embodiment shown in FIG. 5 of a combination weighing machine a considerable number, e.g. twelve weighing pans 17, is arranged side by side with the discharge openings 18 aligned at one side of two aligned subsections 19 and 20 of a receiving conveyor path travelling towards each other and forming part of a delivery conveyor arrangement accommodating further a discharge conveyor path 21 between the receiving sections 19 and 20 and communicating therewith.

According to the invention a stop member which is common to all the weighing pans is associated with the two receiving sections 19 and 20 and has in the illustrated embodiment the form of an elongated brush member 23 that is pivotally suspended so as to cover in one position, as illustrated in FIG. 6, the discharge openings of all the weighing pans irrespective of whether they are actuated to emptying.

From the position shown in FIG. 6 brush member may by pivoting about pivot shaft 24 be moved transversely to receiving sections 19 and 20 to a position at the opposite side of said sections of the receiving conveyor path.

By this movement, illustrated in FIG. 7, which is effected after the weighing pans, from which subportions for a given product portion are to be delivered, are actuated for emptying by a downward-swinging of bottom flap 1, the actual subportions are carried along by their own weight and flowed at an even pace on to receiving sections 19 and 20.

When brush member 23 has reached the other position at the opposite end of subsections 19 and 20 it is lifted above the product subportions emptied on said subsections and fed back to occupy the position shown in FIG. 6, in which it is again lowered to cover the discharge openings of the pans.

After brush member 23 from the position shown in FIG. 6, in which it covers the discharge openings of the weighing pans, has been moved to the other extreme position at the opposite side of each of the receiving sections 19 and 20, said conveyors start moving in the direction towards the discharge conveyor 21 as shown by the arrows 24 and 25 in FIG. 5.

In order to prevent the product units from the two receiving sections 19 and 20 from colliding on the intermediary discharge belt 21 a starting section 22 of belt 21 is by means of a suspended brush member 26 divided into two partial sections 22a and 22b.

In the conveying direction shown by an arrow 27, of the discharge conveyor or the discharge belt 21 the starting section 22 is moreover defined by a suspended brush member 28 acting as a releasable closure member.

When the batches of product units discharged from the weighing pans to the receiving sections 19 and 20 have been conveyed to and collected in the starting section 22 of the discharge conveyor and brush member 23 has been lifted to be fed back to occupy its initial position in front of the discharge openings of the weighing pans, brush member 28 is also lifted and the discharge belt conveys the batch metered by the combination weighing onwards to packaging, e.g. in plastic foil bags. The weighing pans from which subportions are to be delivered to the following batch are concurrently actuated to emptying.

I claim:

1. A weighing pan for weighing products to be packaged batchwise, for use in combination weighing of irregularly shaped and comparatively fragile fruit and vegetable products comprising:

a stationary supporting frame, a pair of side walls and a bottom flap disposed between said side walls, said bottom flap pivotally connected with said stationary supporting frame between a product collecting position and a product discharging position, said side walls and said bottom flap defining a product discharge opening, said product discharge opening being covered by a front wall, said bottom flap being shaped and positioned to collect individual product units substantially arraanged in a single row when said bottom flap is oriented in said product collecting position, said bottom flap extending downwardly towards said discharge opening such that said product units collected in said single row are discharged through said discharge opening in a substantially sliding movement when said bottom flap is oriented in a product discharge position.

2. A weighing pan as claimed in claim 1 in which the bottom flap has the shape of a chute having a cross-section arched concavely downwards.

3. A weighing pan as claimed in claim 1 including means for adjusting an angle of inclination of the bottom flap in the discharging position.

4. A weighing pan as claimed in claim 3 in which an activation member for the pivotal movement of the bottom flap between said collecting and discharging positions is connected with a stationary support for the weighing pan through said means for adjusting the angle of inclination which can be switched between at least two positions, each corresponding to a respective angle of inclination of the bottom flap.

5. A weighing pan for weighing products to be packaged batchwise for use in combination weighing of irregularly shaped and comparatively fragile fruit and vegetable products comprising
a weighing pan having a discharge opening covered by a resiliently yielding front wall and which is opened by a pivotal movement of a bottom flap between a product collecting position and a discharging position,
a resiliently yielding brake member spaced from said front wall and positioned to reduce a velocity of product units which are filled into the weighing pan,
the weighing pan being shaped and positioned to collect individual product units substantially arranged in a single row on the bottom flap so that in the discharging position the bottom flap extends substantially across a length of the weighing pan and slopes downwardly towards the discharge opening at such an angle that collected product units are discharged by a substantially sliding movement.

6. A weighing pan as claimed in claim 5 in which said brake member comprises at least two brushes suspended side by side with a separation therebetween, lower ends of said at least two brushes being positioned relatively close to the bottom flap and spaced at such a distance from the front wall that after having been passed by a first supplied product unit to abut on the front wall said at least two brushes are positioned immediately behind said supplied product unit to retain a next following product unit.

7. A combination weighing machine for weighing subportions of irregularly shaped and comparatively fragile fruit and vegetable products, comprising a plurality of weighing pans having a discharge opening covered by a front wall and which is opened by a pivotal movement of a moveable bottom flap between a product collecting position and a discharging position,
each of said weighing pans being shaped and positioned to collect individual product units substantially arranged in a single row on the bottom flap so that in the discharging position the bottom flap extends substantially across length of the weighing pan and slopes downwardly towards the discharge opening at such an angle that the collected products units are discharged by a substantially sliding movement
a delivery conveyor arrangement in connection with the discharge openings of the weighing pans, in which a stop member common to the weighing pans is associated with a first receiving conveyor path extending along the discharge openings of said plurality of weighing pans in the delivery conveyor arrangement, means for mounting said stop member to be movable transversely to the receiving conveyor path from a first position in which said stop member covers the discharge openings of all the weighing pans, to a second position at one side of the receiving conveyor path, and from there back to the first position along a path above the subportions discharged on the receiving conveyor path.

8. A combination weighing machine as claimed in claim 7, in which the weighing pans are arranged with discharge openings in a row along one side of the receiving conveyor path in which said stop member includes a brush device hanging down along discharge openings of the weighing pans and being pivotally suspended so as to be movable, on one hand, transversely to the receiving conveyor path between said two positions and, on the other hand, to be linearly movable in brush direction between an active stop position and a feed-back position.

9. A combination weighing machine as claimed in claim 8, in which said delivery conveyor arrangement comprises a discharge conveyor path in communication with the receiving conveyor path and a starting section positioned at said receiving conveyor path, said starting section having a collecting capacity corresponding to at least one predetermined product portion and a releasable closure member for barring products from said discharge conveyor.

10. A combination weighing machine as claimed in claim 9 and including a plurality of said weighing pans, in which the receiving conveyor path includes two partial paths travelling towards each other in communication with a same discharge conveyor, and a suspended barring member for dividing the starting section into two partial sections communicating with a respective partial path of the receiving conveyor path.

* * * * *